United States Patent [19]
Habermeier et al.

[11] 3,839,298
[45] Oct. 1, 1974

[54] POLYAMIDES CONTAINING HYDANTOIN OR DIHYDROURACIL GROUPS

[75] Inventors: Jurgen Habermeier, Pfeffingen; Daniel Porret, Binningen, both of Switzerland

[73] Assignee: Ciba Geigy Corporation, Ardsley, N.Y.

[22] Filed: Feb. 23, 1973

[21] Appl. No.: 335,215

[30] Foreign Application Priority Data
Mar. 7, 1972  Switzerland.......................... 3312/72

[52] U.S. Cl...... 260/78 R, 260/32.6 N, 260/33.4 R, 260/33.8 R, 260/857 R, 260/DIG. 34
[51] Int. Cl............................................. C08g 20/20
[58] Field of Search................... 260/78 R, DIG. 34

[56] References Cited
UNITED STATES PATENTS

| | | | |
|---|---|---|---|
| 3,484,407 | 12/1969 | Preston................................. | 260/47 |
| 3,527,732 | 9/1970 | Wolf et al............................. | 260/47 |
| 3,671,614 | 6/1972 | Kunzel et al.......................... | 260/47 |

*Primary Examiner*—Lester L. Lee

[57] ABSTRACT

Polyamides containing hydantoin or dihydrouracil groups are obtained by polycondensing aliphatic-1-cycloaliphatic or aromatic dicarboxylic acids or derivatives of such dicarboxylic acids, in known manner, with diamines which contain hydantoin or dihydroutacil groups. These polyamides have molecular weights of 500 to 50,000. They are more flexible and more readily soluble in organic solvents than known polyamides.

15 Claims, No Drawings

POLYAMIDES CONTAINING HYDANTOIN OR DIHYDROURACIL GROUPS

The invention relates to polyamides containing hydantoin or dihydrouracil groups in which the molecular residues originating from the diamines contain the particular hydantoin or dihydrouracil groups, and in which the nitrogen atoms of the NH.CO— groups are bonded to ethylene or propylene groups.

British Pat. No. 1,223,457 has already disclosed polyamides containing hydantoin groups, in which the molecular residues originating from these diamines contain the particular hydantoin groups. These polyamides, however, do not possess any bonds of the nitrogen atoms of the —NH.CO— groups to ethylene groups, but do possess bonds of these nitrogen atoms to divalent aromatic radicals. Such known polyamides are relatively heat-stable. However, at the same time they show a series of disadvantages. They are very brittle and materials manufactured therefrom show relatively unfavourable mechanical properties. They are sparingly soluble in many organic solvents. For these reasons they can in most cases not be processed from solution, for example to manufacture cast films.

As a further disadvantage of these known polyamides it is necessary to mention that their manufacture requires a very involved and costly process.

Surprisingly, the polyamides, containing hydantoin or dihydrouracil groups, according to the invention are not brittle but are elastic and flexible, and display better mechanical properties than the abovementioned known polyamides. As compared to the latter, they furthermore have the advantage that in most cases their solubility in organic solvents is better and that therefore they are capable of more diverse uses. Furthermore, they can be manufactured considerably more simply and with less effort.

The subject of the invention are polyamides of the general formula $$[-NH-(CH_2)_a-R^1-(CH_2)_a-NH.CO-R-CO-]_n$$

(I)

in which $n$ denotes a number from 2 to 200, $a$ denotes 2 or 3 and R denotes an optionally substituted divalent hydrocarbon radical with 2 – 15 carbon atoms, and in which $R^1$ represents a radical of the formula

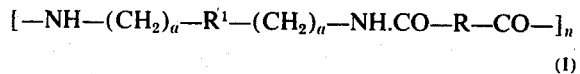

(II)

in which $R^2$ represents an optionally substituted methylene radical and $R^3$ represents an unbranched alkylene radical with 1 to 12 carbon atoms which optionally contains an ether bridge, or $R^1$ represents a radical of the formula

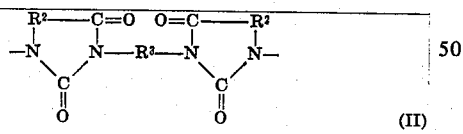

(III)

in which $b$ is 1 or 0 and $R^4$ represents a nitrogen-free divalent radical which is necessary to complete a five-membered or six-membered, unsubstituted or substituted ring.

In the formula (I), R preferably represents an unbranched polymethylene radical with 2 to 10 carbon atoms, 2,2,4-trimethylhexamethylene, 2,4,4-trimethylhexamethylene or a phenylene radical, a tetrachlorophenylene radical or a cyclohexyl radical.

If $R^1$ in the formula (I) denotes a radical of the formula (II), the latter is always a molecular residue containing two hydantoin rings. Such special polyamides represent a preferred form of this invention. In the formula (II), $R^2$ in particular denotes one of the radicals

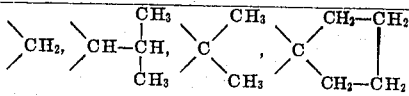

and

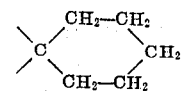

$R^3$ preferably represents methylene, polymethylene with 2 to 12 carbon atoms or the —CH$_2$—CH$_2$—O—CH$_2$—CH$_2$— radical.

If $R^1$, in the formula (I), denotes a radical of the formula (III), it can be either a radical, containing a hydantoin ring or a dihydrouracil ring, of the formula

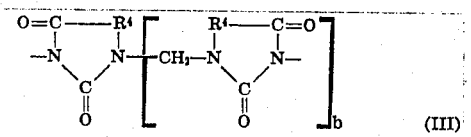

(IV)

or a radical, containing two hydantoin or dihydrouracil rings, of the formula (III), in which $b$ denotes the number 1. Both possibilities represent further preferred forms of the invention.

Depending on whether $R^1$ according to the formula (III) contains dihydrouracil or hydantoin rings, $R^4$ in particular has the meaning of one of the radicals

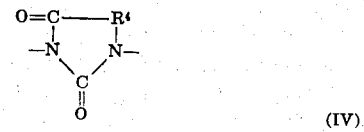

and

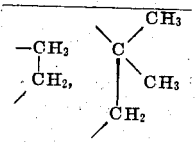

or the meaning of $R^2$ or the radical

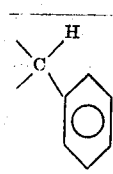

The new polyamides according to the present invention in general have numerical average molecular weights of 500 to 50,000 and softening ranges of about room temperature to 250°C. In all cases in which, here and subsequently, molecular weights are referred to, numerical average molecular weights which are determined according to the vapour pressure osmosis method, are to be understood. The softening range was in each case determined by means of the Kofler bench.

The properties of the new polyamides depend greatly on the nature of the starting components used for their manufacture. In general, very tough, fibre-forming polymers are concerned. However, in the case of a lower degree of polycondensation, products which are viscous at room temperature may also be concerned. In principle, it is also possible to produce more brittle polycondensates.

The polyamides according to the invention are suitable for the manufacture of filaments and fibres. Furthermore, coatings and other mouldings can also be manufactured therefrom. Because of the viscosity and optional breadth of melting range, the polyamides can also be used as hot-melt adhesives. Low molecular grades can also be employed advantageously as curing agents for epoxide compounds or for isocyanates and as plasticisers for plastics.

A further subject of the invention is a process for the manufacture of new polyamides of the general formula

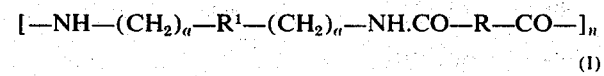

(I)

in which $n$ denotes a number from 2 to 200, $a$ denotes 2 or 3 and R denotes an optionally substituted divalent hydrocarbon radical with 2 – 15 carbon atoms, and in which $R^1$ represents a radical of the formula

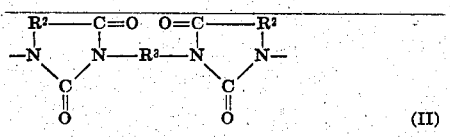

(II)

in which $R^2$ represents an optionally substituted methylene radical and $R^3$ represents an unbranched alkylene radical with 1 to 12 carbon atoms which optionally contains an ether bridge, or $R^1$ represents a radical of the formula

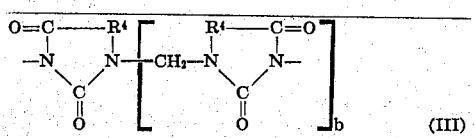

(III)

in which $b$ is 1 or 0 and $R^4$ represents a nitrogen-free divalent radical which is necessary to complete a five-membered or six-membered, unsubstituted or substituted ring, which is characterised in that a dicarboxylic acid of the formula

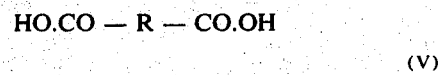

(V)

in which R has the above meaning, or a derivative of this dicarboxylic acid which is capable of polycondensations, is polycondensed with a diamine of the formula

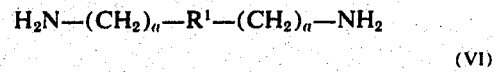

(VI)

in which $R^1$ has the above meaning, in a manner which is in itself known.

Apart from the dicarboxylic acids according to the formula (V) it is also possible, according to the invention, in each case to employ the following derivatives, suitable for polycondensations, of these dicarboxylic acids: the acid dihalides (especially the dichlorides), the acid anhydrides, the dialkyl esters or the monoalkyl esters or the diaryl esters or the monoaryl esters of the dicarboxylic acids.

The polycondensation according to the process of the invention is carried out in a manner which is in itself known, as has been described, for example, in the specialist book "Synthetische Fasern aus Polyamiden" ("Synthetic Fibers from Polyamides") by Hermann Klare, Akademie-Verlag, Berlin 1963.

If starting from the dicarboxylic acids themselves it is in many cases possible advantageously to follow the well-known "AH-salt process," that is to say the double salt of the dicarboxylic acid and the diamine is first manufactured and thereafter the actual polycondensation is carried out. Details regarding this double salt process and the advantages thereof are described, for example, in the specialist book by Hermann Klare which has already been mentioned, on pages 98 – 100.

If the process according to the invention starts from dicarboxylic acids, dicarboxylic anhydrides or the double salts, water is eliminated in the course of the polycondensation. If, on the other hand, dialkyl esters or diaryl esters are employed, the corresponding alkyl alcohol or the corresponding phenol is eliminated during the polycondensation.

On the other hand, if monoalkyl esters or monoaryl esters are employed, water and alcohol, or water and phenol, are eliminated simultaneously. If the process starts from acid dichlorides, hydrogen chloride is eliminated.

Since the polycondensation process is an equilibrium reaction, it is necessary for the manufacture of polyamides of higher molecular weight that the low molecular product eliminated during the polycondensation should be removed continuously.

According to the invention, the reaction can be carried out under normal pressure or under excess pressure. Finally, the remainder of the substances eliminated during the condensation is removed by application of reduced pressure.

In principle, the polycondensation processes which can be used according to the present invention can be carried out in the melt or in solution. In the latter case, the starting substances are in the form of a solution in an organic solvent or in water. Frequently, as, for example, in the double salt process, the reaction is first carried out in solution, the solvent or the water is evaporated as the polycondensation progresses and the end product is finally obtained in the form of a melt.

It is also possible first to manufacture a pre-condensate in solution, to isolate the pre-condensate by filtration and finally to complete the polycondensation in the melt.

Usually, a granulation is finally carried out.

If, according to the invention, the process starts from an acid dichloride, there is a further possible way of carrying out the reaction, namely that of the interfacial condensation. In this process, which is in itself known, the acid dichloride is present in a water-immiscible organic solvent and the diamine in aqueous solution.

As is known, the splitting off of the various low molecular compounds during polycondensation can be forced by polycondensation catalysts. For example, the following catalysts can be used for the splitting off of hydrogen chloride where acid dichlorides are employed: tertiary amines, phosphonium salts, sulphonium salts, hydrazinium salts and the corresponding hydroxides; metal-acid esters, such as alkyl titanates and alkyl vanadates. Ammonium compounds of tertiary amines can also be employed.

If the dicarboxylic acids or the corresponding alkyl esters or aryl esters are employed, the polycondensation can be forced by known esterification or transesterification catalysts. Here, for example, the acetates and oxides of Cd, Zn, Pb, Co, Mg and Sb should be mentioned. Metal-acid esters, such as titanates and vanadates, are also suitable.

The concentration of catalysts should be about 0.01 to 2 mol percent, relative to the acid component.

When using the process according to the invention, it is expedient to add chain regulators to the reaction mixture. Regarding this technique, reference may be made to the already cited specialist book by Hermann Klare, especially pages 193 – 196.

The end groups of the chain molecules (formula I) can be different, depending on the choice of the ratios of the starting components in the reaction mixture, and of the particular chain regulators used. Possible end groups are the —$NH_2$ group, the —CO.OH group and the acid radical groups. If, for example, acetic acid is used as the chain regulator, the molecular residue $CH_3$.CO— occurs as an end group.

Since rather high temperatures are used in the process according to the invention, it is necessary that it should be carried out under a protective gas, preferably under nitrogen.

The dicarboxylic acids, or derivatives thereof suitable for polycondensations, which are preferably employed in the process according to the invention are those in which the radical R in the formula (V) denotes ann unbranched polymethylene radical with 2 to 10 carbon atoms, 2,2,4-trimethylhexamethylene or 2,4,4-trimethylhexamethylene. Thus examples to be mentioned here are succinic acid, glutaric acid, adipic acid, pimelic acid and sebacic acid. The phthalic acids, substituted phthalic acids, the cyclohexyldicarboxylic acids and the corresponding derivatives of these acids are also particularly suitable for the polycondensation.

If diamines in which $R^1$ in the formula (VI) denotes a radical of the formula (II) are employed according to the invention, the radical of the formula (II) is always a molecular residue containing two hydantoin rings. The use of such diamines containing two hydantoin rings is a preferred form of the process according to the invention.

In the formula (II), $R^2$ in particular denotes one of the radicals

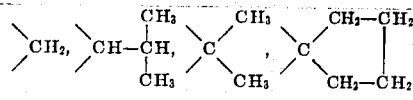

and

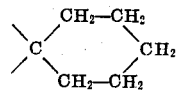

$R^3$ preferably represents methylene, polymethylene with 2 to 12 carbon atoms or the —$CH_2$—$CH_2$—O—$CH_2$—$CH_2$— radical.

If $R^1$ in the formula (VI) denotes a radical of the formula (III), it can either be a diamine, containing a hydantoin ring or dihydrouracil ring, of the formula

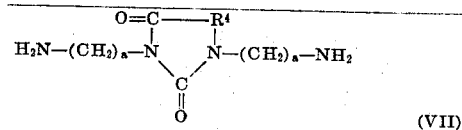

or a diamine, containing two hydantoin rings or dihydrouracil rings, of the formula

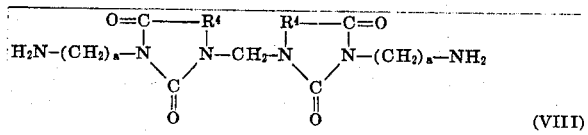

The use of these two possible types of diamine (formulae VII and VIII) represents two further preferred forms of the present invention.

Depending on whether the diamines according to the formulae (VII) and (VIII) containg dihydrouracil groups or hydantoin groups, $R^4$ in particular has the meaning of

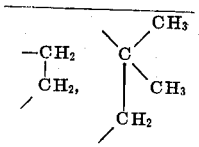

and

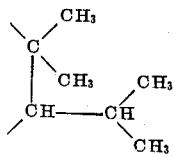

or the meaning of $R^2$ or of the radical

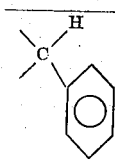

The diamines of the formula (VI) employed according to the process of the invention are, where $R^1$ represents a radical of the formula (II), manufactured by hydrogenation of corresponding bis-($\beta$-cyanoethyl)-hydantoins according to U.S. Pat. No. 3,697,539. On the other hand, those of the diamines employed according to the invention which only contain one heterocyclic ring and in which $R^1$ in the formula (VI) thus corresponds to the formula (IV) can conveniently be manufactured by cyanoethylation of a corresponding hydantoin or of a corresponding uracil or dihydrouracil and subsequent catalytic hydrogenation according to U.S. Pat. Nos. 3,625,844 and 3,644,365.

Diamines which contain, as $R^1$, a radical of the formula (III) possessing two heterocyclic rings, and which can also be employed according to the invention, can also be manufactured in a simple manner by cyanoethylation of a corresponding bishydantoin and subsequent hydrogenation (according to U.S. Pat. No. 3,635,845). The synthesis of analogous diamines possessing 2 dihydrouracil rings is carried out in an equivalent manner using corresponding bis-uracils or bis-dihydrouracils.

The following compounds may be listed as typical diamines which can be employed in the process according to the invention: 1,3-di-(γ-aminopropyl)-5,5-dimethylhydantoin, 1,1'-methylene-bis-(3-(γ-aminopropyl)-5-isopropylhydantoin, β,β'-di-(1-γ-amino-propyl)-5,5-dimethylhydantoinyl-3)-diethyl-ether, 1,3-di-(γ-aminopropyl)-5,5-dimethyl-5,6-dihydrouracil and 1,3-di-(γ-aminopropyl)-5,5-pentamethylene-hydantoin.

A. Manufacturing examples

Example 1

Polyamide from 1,3-di-(γ-aminopropyl)-5,5-dimethylhydantoin and isophthalic acid dimethyl ester 49.3 g of isophthalic acid dimethyl ester (98.5 percent strength) (0.25 mol) and 61.6 g of 1,3-di-(γ-aminopropyl-5,5-dimethylhydantoin (98.4 percent strength) (0.25 mol) are weighed out into a four-neck flask of 200 ml capacity which is equipped with a stirrer, thermometer, nitrogen flushing arrangement and descending condenser with receiver. A mixture of 1.0 g of $PbO_2$, 0.5 g of $Sb_2O_3$ and 0.5 g of tetraisopropyl orthotitanate is added as the catalyst. The reaction mixture is heated to 120°C and is stirred for 2 hours at this temperature; in the course thereof, the distillation of methanol starts. The mixture is then stirred for 2 hours at 150°C, in the course of which 8.0 ml of methanol separate. The temperature is raised to 200°C and the pressure is reduced to 20 mm Hg. After one hour, the pressure is reduced to 0.1 – 0.2 mm Hg and the temperature is raised to 220°C. The melt, which constantly becomes more viscous is stirred for 15 hours under these conditions.

After cooling, the hard mass is finely ground and dissolved in 500 ml of hot chloroform to remove the catalyst residues. Thereafter the solution is filtered and the product is reprecipitated from 1.5 l of diethyl ether. The product is separated off by filtration and dried in a vacuum desiccator; thereafter it is finely powdered and dried to constant weight at room temperature under 0.1 mm Hg.

A colourless, glossy, pulverulent material which melts at 94°C is obtained in quantitative yield (94.9 g). The numerical average molecular weight of this polyamide is determined by vapour pressure osmometry (Mecholab 302 B; Hewlett-Packard) in chloroform at 32.5°C to be 4,240, which corresponds to an average degree of polycondensation of $n = 11 - 12$. Accordingly, the new polyamide has the fllowing average structure:

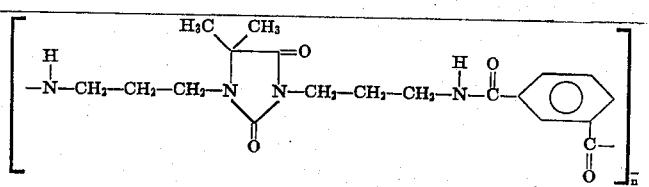

$\bar{n} = 11-12$.

Example 2

The experiment according to Example 1 is repeated, using 0.5 g of PbO, 0.5 g of $Sb_2O_3$ and 0.5 g of tetraisopropyl titanate as catalysts. The condensation is carried out in accordance with the following temperature-pressure programme:

1 hr/120°C//normal pressure
+ 1 hr/150°C//normal pressure
+ 1 hr/180°C//normal pressure
+ 1 hr/200°C//15 mm Hg
+ 3 hrs/200°C//0.1 mm Hg
+ 7 hrs/230°C//0.1 mm Hg
+ 2 hrs/260°C//0.1 mm Hg The working up of the product and the removal of the catalyst are carried out according to Example 1. A polyamide which softens at 91°C is obtained. Its molecular weight (vapour pressure osmosis at 32.5°C in $CHCl_3$) is $\bar{M}_n = 4,080$, and hence $\bar{n} = \sim 11$.

Example 3

The mixture of di-(γ-aminopropyl)-5,5-dimethylhydantoin and dimethyl isophthalate according to Example 1 is heated for 3 hours to 220°C in an autoclave of 500 ml capacity, under nitrogen, in the course of which a pressure of 10 atmospheres is established. The mixture is allowed to cool and the hard, colourless lumps obtained are powdered. They are fused and stirred for a further 5 hours at 270° – 280°C under 0.1 mm Hg. The resulting polyamide has a softening point of 123°C.

Example 4

A mixture of 61.6 g of the 1,3-di-(γ-aminopropyl)-5,5-dimethylhydantoin used in Example 1 (0.25 mol) and 43.5 g of succinic acid diethyl ester (0.25 mol) is polycondensed under the catalytic action of 1.0 g of PbO, 0.5 g of $Sb_2O_3$ and 0.5 g of tetraisopropyl orthotitanate in accordance with the following programme:

5 hrs/120°C//normal pressure
+ 2 hrs/150°C//normal pressure
+ 2 hrs/175°C//normal pressure (followed by removal of 20.5 ml of ethanol)
+ 3 hrs/175°C//15 mm Hg
+12 hrs/200°C//0.1 mm Hg
+ 2 hrs/270°C//0.1 mm Hg Hard lumps are obtained in a quantitative amount; they can be purified by reprecipitation from $CHCl_3$/petroleum ether and the reprecipitated polyamide has a softening point of 40°C.

Example 5 a. 87.7 g of 97.9% strength 1,3-di-(γ-aminopropyl)-5,5-dimethylhydantoin (0.354 mol) are dissolved in 250 ml of tetrahydrofurane, and this solution is added dropwise over the course of 30 minutes, whilst stirring vigorously, to a solution of 51.7 g of adipic acid (0.354 mol) in 480 ml of tetrahydrofurane at 15°C. A flocculent precipitate forms. The mixture is cooled to –30°C and is homogenised by very rapid stirring. The resulting double salt is then filtered off and dried to constant weight in a desiccator over $P_2O_5$/20 mm Hg/20°C. The slightly tacky colourless powder thus produced still contains tetrahydrofurane. It is again comminuted and dried to constant weight at 25°C/0.1 mm Hg.

b. 80.0 g of the double salt obtained according to (a) together with 3.5 g of powdered anhydrous aluminium chloride are fused under a slight stream of nitrogen (reaction remperature 160°C). The mixture is then heated to 235°C over the course of 3 hours whilst stirring and employing a vacuum of 15 mm Hg.

The resulting product was dissolved in 250 ml of hot ethanol, the solution was filtered and the product was precipitated from 2 l of petroleum ether. The solvent mixture was decanted and the product was dissolved in ethanol. After again filtering, the solution is concentrated at 60°C/20 mm Hg and is subsequently dried to constant weight at 75°C/0.2 mm Hg. 62 g of an ochre-coloured powder which has a numerical average molecular weight of 700 (measured by means of the Mod. Mecholab 302 B vapour pressure osmometer in dimethylformamide at 130°C) are obtained.

c. 50 g of the double salt obtained according to (a) are treated in accordance with the following temperature-pressure programme:

1 hr /180°C/N₂ normal pressure
14 hrs/195°C/15 mm Hg
1 hr /195°C/0.3 mm Hg
4 hrs/235°C/0.1 mm Hg
2 hrs/250°C/0.1 mm Hg
14 hrs/260°C/0.1 mm Hg The resulting product is dissolved in 100 ml of chloroform, the solution is filtered and the product is precipitated from 1 l of petroleum ether. The solvent mixture is decanted and the product is dissolved in chloroform. After renewed filtration, the solution was concentrated at 80°/20 mm Hg and the product was dried to constant weight at 200°C/0.02 mm Hg.

30 g of a brown product having a numerical average molecular weight $\overline{M}_n = 1,600$ are obtained.

The micro-analysis gives a nitrogen content of 15.9 percent (theory 15.9 percent). The new polyamide essentially consists of the following base units

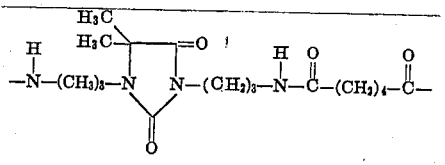

Example 6

The following procedure is employed to manufacture an oligo-amide having predominantly carboxyl end groups: 19.16 g of 1,1'-methylene-bis-(3(γ-aminopropyl)-5-isopropylhydantoin (0.0466 mol) and 10.6 g of hexahydrophthalic acid (0.0616 mol) together with 0.1 g of PbO and 0.1 g of Sb₂O₃ are heated to 150°C over the course of one hour, whilst stirring.

The mixture is then stirred for a further hour at this temperature under a vacuum of 15 mm Hg; it is then treated for 10 hours at 150°C under 0.1 mm Hg and subsequently, again for 10 hours, at 180°C/0.1 mm Hg. Finally, it is additionally stirred for 3 hours at 220°C under 0.1 mm Hg. The dark melt is poured out onto a metal sheet. After solidification, 24.5 g of the glassy mass are powdered and dissolved in 150 ml of hot chloroform, and the solution is clarified by filtration. A pale yellow solution is obtained. The product is isolated by reprecipitation from petroleum ether and vacuum drying. 23 g (90 percent of theory) of a light-coloured powder are obtained. The numerical average molecular weight (measured at 32.5°C in chloroform) is $M_n = 674$. The product softens at 40°C.

Accordingly, the product essentially has the following structure:

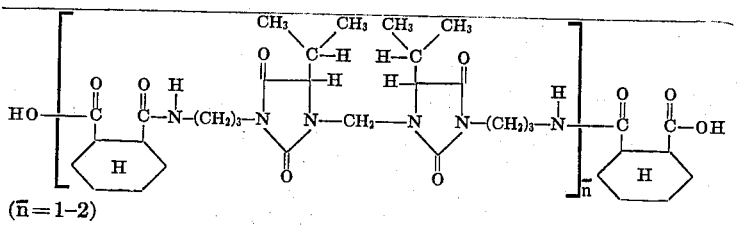
($\overline{n}=1-2$)

Example 7

A mixture of 114.5 g of β,β'-di-(1-(γ-aminopropyl)-5,5-dimethylhydantoinyl-3)-diethyl ether (purity 96.6 percent) (0.25 mol), 36.5 g of adipic acid (0.25 mol), 0.5 g of lead-II oxide, 0.5 g of antimony-III oxide and 0.5 g of tetraisopropyl titanate is heated under nitrogen and stirred in accordance with the following temperature-pressure programme:

35 minutes/150°C/normal pressure
1 hour/160°C/normal pressure
1 hour/180°C/normal pressure
1 hour/180°C/15 mm Hg
15 hours/180°/0.05 - 0.1 mm Hg
8 hours/220°C/0.1 mm Hg
3 hours/260°C/0.1 - 0.3 mm Hg A dark-coloured crude product is obtained in quantitative yield. The polyamide is comminuted, 113 g thereof are dissolved in 800 ml of hot chloroform and the solution is filtered. After cooling the solution, the product is reprecipitated from 3,000 ml of petroleum ether at −10°C. After drying, 96 g (84 percent of theory) are obtained. The numerical average molecular weight determined by vapour pressure osmometry is $\overline{M}_n = 2,640$.

Accordingly, the base unit of this polyamide essentially consists of:

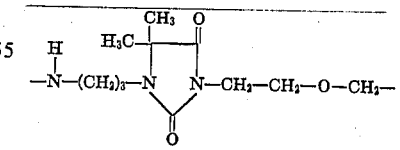

Example 8

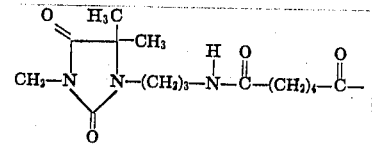

a. A solution of 144.26 g of the diamine used in Example 1 (0.6 mol) in 750 ml of tetrahydrofurane is added dropwise, simultaneously with a solution of 120.14 g of sebacic acid (0.6 mol) in 750 ml of tetrahydrofurane, to 1,600 ml of vigorously stirred tetrahydrofurane at room temperature. The double salt, obtained in snow-white flakes, is dried as described in Example 5 (a). 263 g of a colourless powder (98.5 percent of theory), which melts at about 80°C and is strongly hygroscopic, are obtained.

b. 70 g of the double salt manufactured according to Example 8 (a) are stirred in a glass apparatus under nitrogen in accordance with the following programme:

1. 3 hours/130°C/normal pressure
2. 2 hours/160°C/normal pressure
3. 1 hour /180°C/normal pressure
4. 1 hour /180°C/15 mm Hg
5. 5 hours/180°C/0.1 mm Hg
6. *12 hours/220°C/0.1 mm Hg
7. **5 hours/260°C/0.1 mm Hg.

A sample taken after 6.)* has a numerical average molecular weight $\overline{M}_n = 4,080$. After 7.)**, $\overline{M}_n = 4,950$. The product is a clear, hard and tough polyamide which is light ochre-coloured; the yield is practically quantitative.

The micro-analysis gives the following values:

| Found | Calculated (assumption: n = 12, and —H and —OH as end groups) |
|---|---|
| 13.6 % N | 13.66 % N |
| 9.0 % H | 8.89 % N. |

The proton-magnetic resonance spectrum (60 Mc-HNMR, recorded in CDCl₃ at 35°C; against tetramethylsilane as the internal standard) shows signals at $\delta =$ 6.5 – 6.8, which are atributable to the amide group, in addition to the usual other signals.

Accordingly, the average structure of the new polyamide is the following:

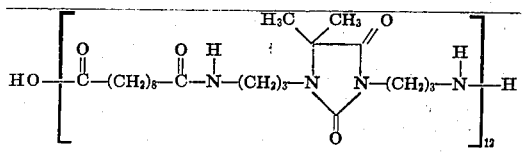

c. 22.2 g of the double salt manufactured according to 8 (a) are dissolved in 150 ml of DMF, 10.3 g of imidazole and 47.1 g of triphenylphosphite are added and thereafter the mixture is stirred at room temperature (Polymer journal, volume 2, No. 5 pp 672–674 (1971).

The product is precipitated from the clear solution by means of acetone and is dissolved in chloroform, the solution is filtered and the product is thereafter reprecipitated in petroleum ether. The product which has precipitated is dissolved in chloroform and dried to constant weight at 200°C/0.1 mm Hg. 10 g of a light yellow polyamide which has a numerical average molecular weight of $\overline{M}_n = 7,250$ are obtained. (Vapour pressure osmometry, measured in chloroform); $n \approx 25$.

The new polyamide consists essentially of the same base units as described in Example 8 (b).

Example 9

100 g of the double salt manufactured according to Example 8 (a) are treated with 0.5 g of lead-II oxide, 0.5 g of antimony-III oxide and 0.5 g of tetraisopropyl titanate in accordance with the following programme:

1 hr /130°C/normal pressure
+ 1 hr /160°C/normal pressure
+ 1 hr /180°C/normal pressure
+1/2 hr/180°C/15 mm Hg
+10 hrs/180°C/0.1 mm Hg
+10 hrs/220°C/0.1 mm Hg
+ 3 hrs/265°–280°C/0.1 mm Hg.

92 g of a very tough crude polyamide (98.5 percent theory) are obtained. To remove the catalysts, this polyamide is dissolved in 600 ml of boiling chloroform and the solution is filtered and centrifuged to remove the last colloidal traces of catalyst. The clear, practically colourless solution is reprecipitated from 3,500 ml of petroleum ether. After drying at room temperature under 0.1 mm Hg, 89 g of purified polyamide of which the base unit is identical with that manufactured according to Example 8 are obtained, but the degree of polycondensation is here $n = 10–11$ ($\overline{M}_n = 4,335$).

Example 10

A mixture of 65.3 g of 1,3-di-(γ-amino-propyl)-5,5-dimethyl-5,6-dihydrouracil (98.2 percent strength) (0.25 mol), 71.5 g of tetrachlorophthalic anhydride (0.25 mol) and 0.5 g of lead-II oxide, 0.5 g of antimony-III oxide and 0.5 g of tetraisopropyl titanate is fused under nitrogen at 150°C and then slowly heated to 225°C over the course of 2 hours; whilst doing so, 4.5 ml of water are distilled off (100 percent of theory). Thereafter the mixture is additionally kept for 4 hours at 15 – 25 mm Hg and 232° – 240°C.

After cooling, a hard and brittle, dark crude product is obtained in 82 percent yield (108 g). This is dissolved in 325 ml of boiling chloroform, the solutin is clarified by filtration and the product is precipitated from 1,500 ml of petroleum ether at 0°C. 103 g of an intensely yellow polyamide melting at 184°C (Mettler FP51) is obtained. The numerical average molecular weight is $\overline{M}_n = 1,200$. The new polyamide consists essentially of the following base units:

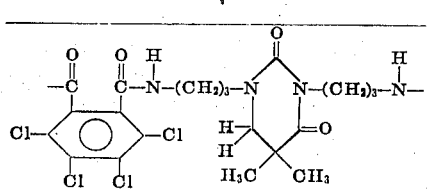

Example 11

A mixture of 87 g of pyridine (1.1 mols), 1 l of chloroform and 121.15 g of the diamine used in Example 1 (0.5 mol) is stirred at 17°C whilst cooling. A solution of 119.5 g of sebacic acid dichloride (0.5 mol) in 250 ml of chloroform is added dropwise over the course of 50 minutes to this clear solution, whilst stirring vigorously. This produces a thick white paste. After the dropwise addition, the mixture is stirred for a further 3 hours at 65°C. It is cooled to room temperature and diluted with 500 ml of chloroform, and the pyridine hydrochloride precipitate is filtered off. The clear, colourless solution is twice washed with 200 ml of water, separated off and concentrated on a rotary evaporator at 50°C and thereafter the residue is dried to constant weight at 125°C under 0.1 mm Hg.

153 g of (75 percent of theory) of an almost colourless, clear, hard and tough polyamide are obtained, of which the base unit is identical with the product described in Example 8 (b), though the numerical average molecular weight is now $\overline{M}_n = \sim 800$.

Example 12 a. The double salt described in Example 5(a) is manufactured in a purer form as follows: 131.5 g of adipic acid (0.3 mol) dissolved in 1,350 ml of isopropanol are added to a solution of 216.4 g of 1,3-di-(γ-aminopropyl)-5,5-dimethylhydantoin in 1,350 ml of ethanol. The components are mixed by stirring and the mixture is left to stand for 10 hours at 20°C. The colourless crystals are isolated by suction filtration; their melting point is 178° – 181°C. The yield is 243 g. 150 g of these crystals are further purified by recrystallisation from 2.2 l of dry methanol. 120 g of a colourless powder, which is dried under 0.1 mm Hg over $P_2O_5$ in a desiccator, are obtained. The very hygroscopic double salt thus obtained melts at 180° – 182°C. The elementary analysis shows:

| found | calculated |
|---|---|
| 52.5 % C | 52.4 % C |
| 14.6 % N | 14.4 % N | b.) 50 g of the double salt manufactured and dried according to Example 12 are polycondensed as follows, without addition of catalysts:

| 1.) | 1 hour /160°C/ normal pressure/$N_2$ atmosphere |
| 2.) | 1 hour /190°C/ normal pressure/$N_2$ atmosphere |
| 3.) | 1 hour /200°C/ normal pressure/$N_2$ atmosphere |
| 4.) | 10 hours /205°C/ 50–70 mm Hg/$N_2$ atmosphere |
| 5.) | 8 hours /205°C/ 15–20 mm Hg/$N_2$ atmosphere |
| 6.) | 2 hours /220°C/ 0.2 mm Hg/$N_2$ atmosphere |
| 7.) | 4 hours /260°C/ 0.2 mm Hg/$N_2$ atmosphere |

The mixture is cooled to 35°C (under $N_2$), and dissolved in 100 ml of chloroform and the solution is filtered and concentrated to dryness. Thereafter, the residue is dried at 120°C (0.1 mm Hg) to constant weight.

46.5 g (theory = 45.36 g) of a very tough, clear and transparent polyamide are obtained, of which the molecular weight determined by vapour pressure osmometry is $\overline{M}_n = 6,310$. Accordingly, the product essentially has the following structure:

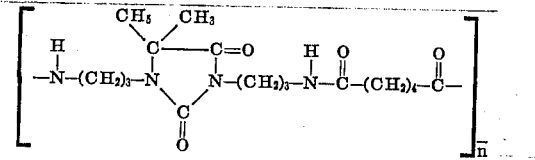

$\bar{n} = \sim 18$

Example 13 a. A double salt manufactured similarly to the description in Example 12(a), from: α) 61.9 g of 1,3-di-(γ-aminopropyl)-5,5-pentamethylenehydantoin (0.3 mol) in 328.5 ml of a 1:1 mixture of tetrahydrofurane and absolute ethanol and β) 44.28 g of sebacic acid (0.3 mol) in 328.5 ml of a mixture of tetrahydrofurane and ethanol, 1:1.

These two solutions are added dropwise, whilst stirring, to 8 l of a mixture of tetrahydrofurane and absolute ethanol (1:1). The mixture is left to stand for 10 hours at 20°C and is worked up according to Example 12(a). 104.2 g of colourless, strongly hygroscopic crystals melting at 137° – 139°C are obtained.

| found | calculated |
|---|---|
| 59.6% C | 59.5% C. | b. 50 g of the double salt manufactured according to Example 13(a) are condensed as follows, without the aid of catalysts:

| 1.) | 10 hours/160°C/ normal pressure | /$N_2$ atmosphere |
| 2.) | 3 hours/180°C/ 20 mm Hg | /$N_2$ atmosphere |
| 3.) | 7 hours/180°C/ 0.2 mm Hg | /$N_2$ atmosphere |
| 4.) | 12 hours/220°C/ 0.2 mm Hg | /$N_2$ atmosphere |
| 5.) | 10 hours/260°C/ 0.2 mm Hg | /$N_2$ atmosphere. |

Working up takes place according to Example 12(b). 40.2 g (theory = 46.3 g) of the polyamide with $\overline{M}_n = 2,770$ are obtained. The new polyamide consists of the following base units:

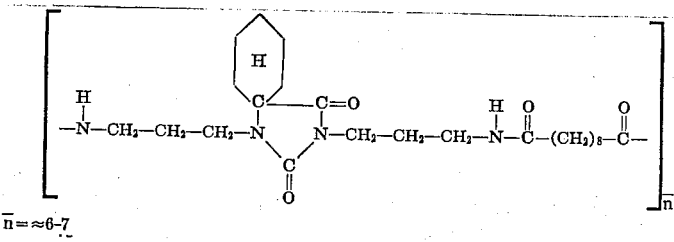

$\bar{n} = \approx 6-7$

Example 14

A mixture of 24.2 g of 1,3-di-(γ-aminopropyl)-5,5-dimethylhydantoin (0.1 mol) and 18.8 g of 1,1,4-trimethyladipic acid (0.1 mol) is treated in accordance with the following programme:

| 1 hr /160°C / | $N_2$ normal pressure |
| 16 hrs/200°C / | 15 mm Hg |
| 2 hrs/240°C / | 1 mm Hg |
| 5 hrs/260°C / | 1 mm Hg |

The product obtained in quantitative yield is taken up in chloroform and precipitated from petroleum ether.

The numerical average molecular weight is $M_n = 950$ (measured in $CHCl_3$ at 32.5°C, by vapour pressure osmometry) and the micro-analysis shows a nitrogen content of 14.5 percent (theory 13.8 percent). The polyamide essentially consists of the following base units:

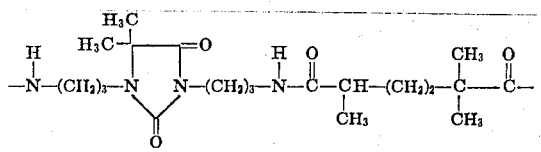

Example 15

A mixture of 24.2 g of 1,3-di-(γ-amino-propyl)-5,5-dimethylhydantoin (0.1 mol) and 20.2 g of adipic acid diethyl ester (0.1 mol) is treated in accordance with the following programme:

| | |
|---|---|
| 6 hrs/120 – 196°C | /N₂ normal pressure |
| 12 hrs/196°C | /N₂ normal pressure |
| 4 hrs/196°C | /15 mm Hg |
| 5 hrs/196°C | /0.2 mm Hg |
| 1 hr /235°C | /0.2 mm Hg |

A brown product which has a nitrogen content of 16.3 (theory 15.9) is obtained in quantitative yield.

The polyamide consists essentially of the following base units:

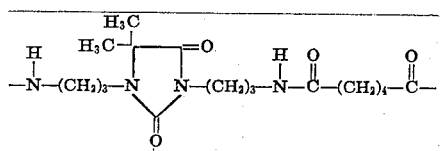

Example 16

A solution of 6.3 g of 1,3-di(γ-aminopropyl)-5,5-dimethylhydantoin (0.025 mol) and 5.3 g of sodium carbonate (0.05 mol) in 125 ml of distilled water is vigorously stirred by means of a domestic mixer. 5.05 g of freshly distilled terephthaloyl chloride in 40 ml of chloroform are added to this solution over the course of 10 minutes. In the course thereof, the temperature rises slightly and the polyamide precipitates as a colourless gummy mass. The solvents are decanted and the sediment is dissolved in 40 ml of dimethylformamide. The viscous solution is filtered and the product is obtained by precipitation with 500 ml of water. The precipitate is repeatedly rinsed with water and subsequently dried at 100°C/20 mm Hg. The polyamide thus obtained is practially colourless and its softening point (according to Kofler) is about 204°C. The product has a degree of polycondensation of $n = 18$ which corresponds to a numerical average molecular weight of approx. 6,100.

Example 17

A type of interfacial polycondensation is carried out as follows with a solution of 5.05 g of freshly distilled terephthalic acid dichloride (0.025 mol) in 100 ml of pure carbon tetrachloride and a solution of 6.3 g of 1,3-di-(γ-aminopropyl)-5,5-dimethylhydantoin (0.025 mol) in 50 ml of distilled water. The second solution is carefully placed on top of the first solution, whereupon a film of the corresponding polyamide is immediately formed at the interface. A glass rod which is slowly and uniformly rotated by a motor, is immersed at right angles to the film plane. In this way, a cap of polyamide forms around the glass rod over the course of approx. 5 hours. This cap is removed, repeatedly washed in carbon tetrachloride and subsequently extracted by boiling in water. It is then dried at 100°C/20 mm Hg. A colourless polyamide which softens at about 200°C, is obtained. Its numerical average molecular weight is 8,600, corresponding to a degree of polycondensation of approx. 23. These values are obtained by comparing $\eta_{spec/c} = 1.11$ (measured at 1 percent strength concentration in concentrated $H_2SO_4$) with $\eta_{spec/c}$ of samples of the same base structure but low molecular weight, of which the numerical average molecular weight is known from vapour pressure osmometry measurements.

Example 18

The experiment according to Example 15 is repeated but 10 times the amount of each of the substances is employed. The product is worked up analogously to Example 15. A colourless polyamide of $\eta_{spec/c} = 0.92$ ($\overline{M}n \sim 7,200$) is obtained, of melting point (Mettler FP 51/2°/min) 230°C. A 5 percent strength solution in dimethylformamide is prepared from 30 g of this polyamide, and approx. one-third of the dissolved polyamide is precipitated from this solution by slow addition of diethyl ether at room temperature. The precipitated product ($\sim$ 10 g) is dried at 80°C/15 mm Hg; it has a viscosity of $\eta_{spec/c} = 1.23$ ($\overline{M}n \sim 9,600$).

The same process is repeated twice more, in each case precipitating about one-third of the weighed-out amount of the previous fraction. It is found that in the course of this the numerical average molecular weight rises from $\overline{M}n \sim 9,600$ to $\overline{M}n \sim 11,000$ and $\overline{M}n = 12,200$; the corresponding viscosity values are $\eta_{spec/c} = 1.23 \rightarrow 1.42 \rightarrow 1.57$.

This last, higher molecular, fraction is again subjected to a fractional precipitation by dissolving its total amount (approx. 1 g) in 20 g of dimethylformamide, adding sufficient ether at room temperature to produce a heavy cloudiness, warming until the cloudiness disappears and causing the precipitation by cooling to 10°C.

The product is dried in the customary manner. This highest isolated fraction has a viscosity of $\eta_{spec/c} = 2.23$, corresponding to a numerical average molecular weight of $\overline{M}n \sim 17,500$.

B. Use example

Example I 47 g of the polyamide manufactured according to Example 8(b) are mixed with 6 g of a bisphenol 1-epoxide resin with 5.6 epoxide equivalents/kg at 120°C. The melt becomes homogeneous after about 10 minutes. Curing takes place in an aluminum mould in 18 hours at 150°C. Very impact-resistant and folding-resistant press specimens are obtained.

Example II (Apparatus: Mettler TA-1; amount weighed out: 50 mg; 2°C/min; 5 mg/min.)

The comparison of the heat stabilities of the polyamide according to the invention, manufactured according to Example 8, with commercially available Nylon 66 gives the following results:

| | Polyamide according to Example 8 | Nylon 66 |
|---|---|---|
| Evaporation (%) | 3.3 | 4.7 |
| Decomposition under nitrogen (1 /min) at | 360°C | 342°C |
| Decomposition in air (1 /min) at | 353°C | 330°C |
| Decomposition maximum in air at | 412°C | 415°C |

The example shows that the polyamides according to the invention have the same decomposition maximum but a higher heat stability than conventional polyamides; furthermore, the working up according to Example 12 shows that these new polyamides dissolve readily in organic solvents, in contrast to the known aromatic polyamides with a relatively low hydantoin content per base unit.

Example III

The heat stability of the polyamide manufactured according to Example 8c is determined by means of thermogravimetric analysis, as follows:

Start of decomposition in air (1 percent /min) at 295°C
Start of decomposition in $N_2$ do. do. at 322°C
Maximum speed of decomposition in air at 390°C
Maximum speed of decomposition in $N_2$ at 403°C

What we claim is:

1. A polyamide of the formula $$(-NH-(CH_2)_a-R^1-(CH_2)_a-NH\cdot CO-R-CO-)_n \quad (I)$$

in which $n$ denotes a number from 2 to 200, $a$ denotes 2 or 3 and R denotes a divalent hydrocarbon radical with 2 to 15 carbon atoms, and in which $R^1$ represents a radical of the formula

[structure II]

in which $R^2$ represents a methylene radical and $R^3$ represents an unbranched alkylene radical with 1 to 12 carbon atoms which may be interrupted by an ether bridge or $R^1$ represents a radical of the formula

[structure III]

in which $b$ is 1 or 0 and $R^4$ represents a radical selected from the group consisting of

[structures]

2. The polyamide according to claim 1, characterised in that R represents an unbranched polymethylene radical with 2 to 10 carbon atoms, 2,2,4-trimethylhexamethylene or 2,4,4-trimethylhexamethylene.

3. The polyamide according to claim 1, characerised in that R represents one of the radicals selected from the group consisting of

[structures]

and

[structure]

4. The polyamide according to claim 1, characterised in that $R^1$ represents a radical of the formula (II) in which $R^2$ and $R^3$ have the above meaning.

5. The polyamide according to claim 1, characterised in that $R^1$ represents a radical of the formula (II), in which $R^2$ represents the radical

[structure]

6. The polyamide according to claim 1, characterised in that $R^1$ represents a radical of the formula

[structure IV]

in which $R^4$ has the above meaning.

7. The polyamide according to claim 1, characterised in that $R^1$ represents a radical of the formula (III) and therein $R^4$ has the above meaning and $b$ denotes the number 1.

8. The polyamide according to claim 1, characterised in that $R^2$ denotes one of the radicals selected from the group consisting of

[structures]

and

[structure]

9. The polyamide according to claim 1, characterised in that $R^3$ represents methylene, polymethylene with 2 to 12 carbon atoms or the $-CH_2-CH_2-O-CH_2-CH_2-$ radical.

10. The polyamide according to claim 9, characterised in that $R^3$ represents the $-CH_2-CH_2-O-CH_2-CH_2-$ radical.

11. The polyamide according to claim 1, characterised in that $R^4$ denotes one of the radicals selected from the group consisting of

[structures]

and

[structures]

12. The polyamide according to claim 1, characterised in that $R^4$ has the meaning of $R^2$ or represents the radical

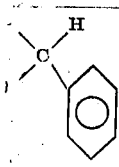

13. The polyamide according to claim 12, characterised in that $R^4$ represents the radical

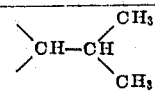

14. The polyamide according to claim 1, characterised by numerical average molecular weights of 500 to 50,000 and by softening ranges from room temperature to 250°C.

15. The polyamide according to claim 1, characterised in that in the formula (I) a denotes the number 3.

* * * * *